United States Patent
Evanchik et al.

(10) Patent No.: US 7,895,330 B2
(45) Date of Patent: Feb. 22, 2011

(54) QUEUING OF INSTANT MESSAGING REQUESTS

(75) Inventors: Stephen A. Evanchik, Malden, MA (US); Alister D. Lewis-Bowen, Cambridge, MA (US); Louis M. Weitzman, Brookline, MA (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 11/551,278

(22) Filed: Oct. 20, 2006

(65) Prior Publication Data

US 2008/0147863 A1 Jun. 19, 2008

(51) Int. Cl.
G06F 15/173 (2006.01)

(52) U.S. Cl. ............... 709/226; 709/230; 379/265.09; 379/265.11

(58) Field of Classification Search ............... 709/226, 709/230; 379/265.09, 265.11
See application file for complete search history.

(56) References Cited

U.S. PATENT DOCUMENTS

| | | | |
|---|---|---|---|
| 6,230,287 B1 * | 5/2001 | Pinard et al. | 714/31 |
| 6,404,747 B1 | 6/2002 | Berry et al. | 370/270 |
| 6,553,114 B1 * | 4/2003 | Fisher et al. | 379/265.12 |
| 6,665,395 B1 * | 12/2003 | Busey et al. | 379/265.09 |
| 6,981,020 B2 | 12/2005 | Miloslavsky et al. | 709/204 |
| 7,023,979 B1 | 4/2006 | Wu et al. | 379/265.11 |
| 7,043,004 B1 | 5/2006 | Khuc et al. | 379/265.01 |
| 2002/0087648 A1 | 7/2002 | Petrovykh | 709/201 |
| 2003/0043179 A1 * | 3/2003 | Gusler et al. | 345/708 |
| 2003/0108183 A1 | 6/2003 | Dhir et al. | 379/265.01 |
| 2004/0093230 A1 * | 5/2004 | Deogard | 705/1 |
| 2005/0086290 A1 * | 4/2005 | Joyce et al. | 709/202 |
| 2006/0075029 A1 | 4/2006 | Kelso et al. | 709/206 |
| 2007/0116185 A1 * | 5/2007 | Savoor et al. | 379/9 |
| 2007/0129996 A1 * | 6/2007 | Babine et al. | 705/11 |

* cited by examiner

Primary Examiner—Wing F Chan
Assistant Examiner—Hitesh Patel
(74) Attorney, Agent, or Firm—Jon A. Gibbons; Fleit Gibbons Gutman Bongini & Bianco PL

(57) ABSTRACT

A method and system for routing or directing calls in a call center, service center, or help desk environment includes a versatile queuing mechanism that supports instant messaging or electronic communications or mail in support of received calls taken by the help desk. The queuing mechanism provides predefined categories of different areas of expertise, automatic distribution to different skills levels of escalating expertise based on each request, multiple experts for each category monitoring the queues for new requests, and, as the requests come in, the experts can manually pull the new requests or be given the requests automatically. For each request, there is automated control of the number of instant messages any one expert is allowed to handle. The expert resolution can be used as feedback in the entire support process for evaluation.

11 Claims, 11 Drawing Sheets

QUEUING OF INSTANT MESSAGING REQUESTS

FIELD OF THE INVENTION

The present invention relates, in general to information help desks, and more particularly relates to managing large numbers of instant-messaging requests for information from experts within a help center.

BACKGROUND OF THE INVENTION

Call-receiving centers that provide information and assistance to callers are commonly referred to as "help desks". Help desks assist callers in troubleshooting problems arising from things such as installation and usage of software and hardware. Because help desks are an effective way to alleviate customer frustration and also lower the rate of product return, many corporations provide help desk support to their customers via a toll-free number.

Help desks are manned by a number of human operators that answer user calls and provide assistance to the callers. The operators are usually given special training that allow them to provide help in the areas that users are likely to need help in. These operators are commonly referred to as "experts". It can logically be anticipated, however, that an expert will not be able to answer every question that a user may have. For this reason, many help desks are set up so that experts are able to turn to others that are better equipped to provide help in a certain area that the caller is seeking help in. This may be done by routing the user directly to another expert-sometimes called a "second-level" expert-via, for instance, transferring the call, or by consulting the second-level expert for help in fulfilling the user's needs.

One way to consult the second-level expert is to place the caller on hold and for the first expert to directly call the second expert. This is unpleasant to the caller that is placed on hold, as they are made to wait alone. A second option is to use an "instant messenger" to send "instant messages". The instant messenger provides a form of real-time communication between two or more people based on typed text, which is conveyed via computers connected over a network. In some help desks, an instant messaging system is used for communication between a customer and an expert within the company or, alternatively, can be used internally, between a first-level expert to a second-level expert. The instant messaging system works with a web browser or other software and allows a customer to speak to an expert by typing his questions or comments. The expert can answer back by typing into a user interface on the expert's computer. Used internally, an instant messaging system allows the first-level expert to remain on the line, either through IM or phone call, with the user while simultaneously communicating with a second-level expert, often times without the user realizing the communication is taking place.

Because it is impossible to predict what questions a caller may have or the number of callers calling a help desk at a given time, it is not efficient to have first-level experts depending on chance to find a second-level expert available for consultation each time the first-level expert has a question. Furthermore, experts in the same field naturally have differing amounts of knowledge on specific subjects. Therefore, one expert may be better suited to answer a question than is another expert. For these reasons and more, a system that provides only the ability for a first-level user to connect directly to single second-level user is inefficient, and in many cases, ineffective.

Therefore a need exists to overcome the problems with the prior art as discussed above.

SUMMARY OF THE INVENTION

Briefly, in accordance with the present invention, disclosed is a method and apparatus for managing help desk requests within a help center through use of a novel messaging queue. The method includes receiving, from a first-level expert client information processing terminal in a help desk, an instant-message query that includes a request for information and placing the instant-message query in a support queue that is viewable while in the support queue to a plurality of second-level experts within the help desk.

In accordance with another feature of the present invention, the method also includes receiving from the first-level expert client information processing terminal, a call-support category of the instant-message query.

In accordance with yet another feature of the present invention, the method includes a step of placing the instant-message query in a sub-queue within the support queue based on the call-support category of the instant message query, wherein each sub-queue has a plurality of second-level experts associated therewith.

In accordance with still another feature of the present invention, the method includes selecting, by a support manager application, one of the plurality of second-level experts to receive the instant-message query, and automatically forwarding the instant-message query from the queue to the selected second-level expert.

In accordance with an additional feature of the present invention, the method includes monitoring, by the support manager application, a number of queries being handled by each expert in the plurality of second-level experts, and comparing the number of queries being handled by each of the second-level experts to a maximum number of queries to be handled.

In accordance with another feature of the present invention, the method includes the step of accepting, from one of the plurality of second-level experts, a request for delivery of the query.

In accordance with a further feature of the present invention, the method included the step of monitoring, by a support manager application, queries being handled by the one of the plurality of second-level experts and routing requests to one of the plurality of second-level experts based on either a number of queries being handled by the one of the plurality of second-level experts, a duration of at least one current session for the one of the plurality of second-level experts, or a level or expertise of the one of the plurality of second-level experts.

In accordance with another feature of the present invention, the method includes the step of creating a log of the query and a second-level expert's response to the query.

In accordance with an embodiment of the present invention, the instant messaging server for communicating with experts includes an input for receiving an instant message query from a phone operator and at least one instant message support queue for storing the instant message query, wherein the instant message query is viewable while in the support queue to a plurality of experts using instant messengers.

In accordance with another feature of the present invention, the instant messaging server also includes a plurality of categorized queues available for submitting the instant message query.

In accordance with one more feature of the present invention, each category of the queue has a plurality of second-level experts associated therewith.

In accordance with another feature of the present invention, a processor automatically forwards, from the instant message queue, the query to an expert selected from the plurality of second-level experts.

In accordance with one additional feature of the present invention the processor monitors the queries being handled by experts in the plurality of second-level experts and prevents the automatically forwarding of the query to a second expert in the plurality of second-level experts based on either a number of queries being handled by the one of the plurality of second-level experts, a duration of at least one current session for the one of the plurality of second-level experts, or a level or expertise of the one of the plurality of second-level experts.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "program", "software application", and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to an embodiment, overcomes problems with the prior art by providing a system and method for allowing help desk phone operators to request support in one of a number of categories by placing instant message requests into queues that are monitored by experts in those categories. The invention is carried out in one embodiment by layering on top of the instant messaging software, a queuing system that allows experts to grab requests from a support queue as well as put requests back if they are unable to answer the question.

Figure 1:
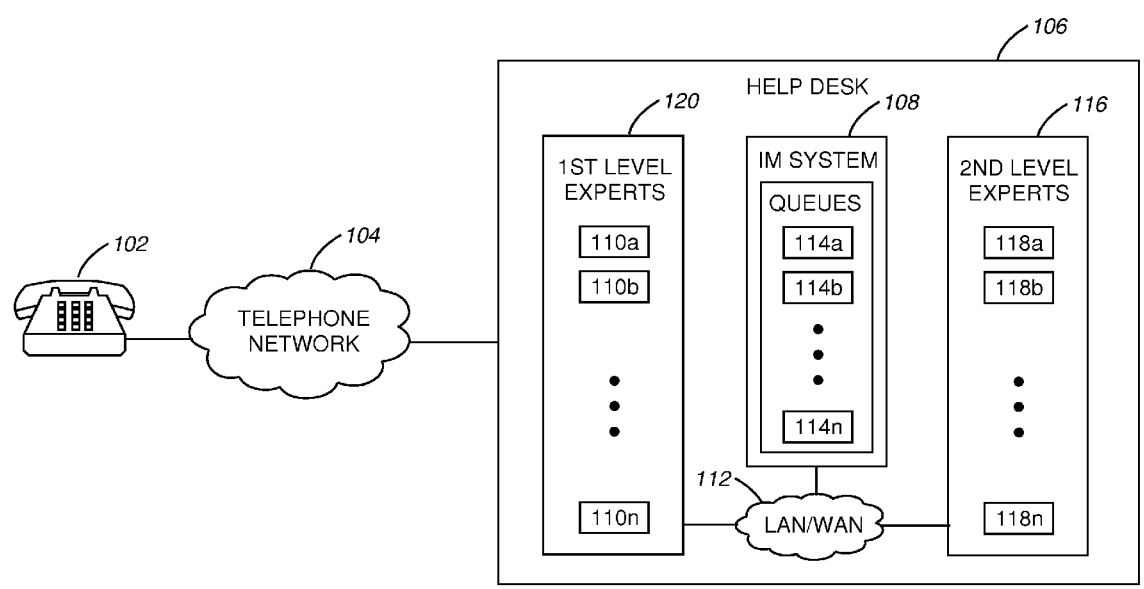
FIG. 1 is a diagram illustrating a help-desk system according to an embodiment of the present invention.

FIG. 1 illustrates a help-desk system suitable for implementing the present invention. The system includes a phone 102 that is used by a user to communicate with a help desk 106 through a network 104. The network 104 can be a public switched telephone network (PSTN), a wireless network, the internet, or a combination thereof.

The help desk 106 is a communication interface between a corporation or other entity and its customers, clients, or anyone associated with that entity. Users are able to contact the help desk to receive help, information, advice, and more for resolving issues, solving problems, and gaining knowledge. For instance, a software company may provide a help desk staffed with telephone operators trained in aspects of the software sold by that company to answer customer's calls and assist the customers with questions related to installation and use of the company's software products. The help desk is often times very effective in relieving customer frustration.

In accordance with an embodiment of the present invention, the help desk 106 includes a plurality 120 of first-level experts 110*a-n*. The plurality 120 of first-level experts 110*a-n* are the first level of service to callers. The first-level experts 110*a-n* may answer the incoming calls themselves or they may receive the call from an operator answering the phone. Regardless of how a first-level expert is connected to a caller, the first-level expert engages in a dialog with the caller in an effort to provide the caller with information or to assist the caller in solving a problem.

If it becomes apparent that a first-level expert 110*a-n* is not able to fully service the caller, any of the first-level experts 110*a-n* are able to request assistance from one or more of a plurality 116 of second-level experts 118-*a-n*. In one embodiment, the second-level experts 118*a-n* are specially trained in specific categories, such as hardware, software, accounting, and others. Consulting these second-level experts can be of great benefit to the caller and to the first-level expert in expediting a solution to the caller's particular issue. For instance, if a caller is expressing to a first-level expert that they are having difficulty installing software, and it is determined that the caller is using an outdated operating system, a second-level expert that has special knowledge of that outdated operating system may be of great benefit to solving the problem. In this case, the first-level expert handling the call will want to solicit advice from the second-level expert.

To avoid disruption to the conversation between the caller and the first-level expert, the first-level expert, through use of the present invention, is able to avoid placing the caller on hold, but still communicate with the second-level user 118a-n. This communication between the first-level user and a second-level user is accomplished through instant messaging. More specifically, any of the first-level experts 110a-n are able to utilize an instant messaging system 108, shown in FIG. 1, to communicate with the second-level experts 118a-n by, for example, one or more instant messages that can be placed within one or more queues 114a-n.

Figure 2:
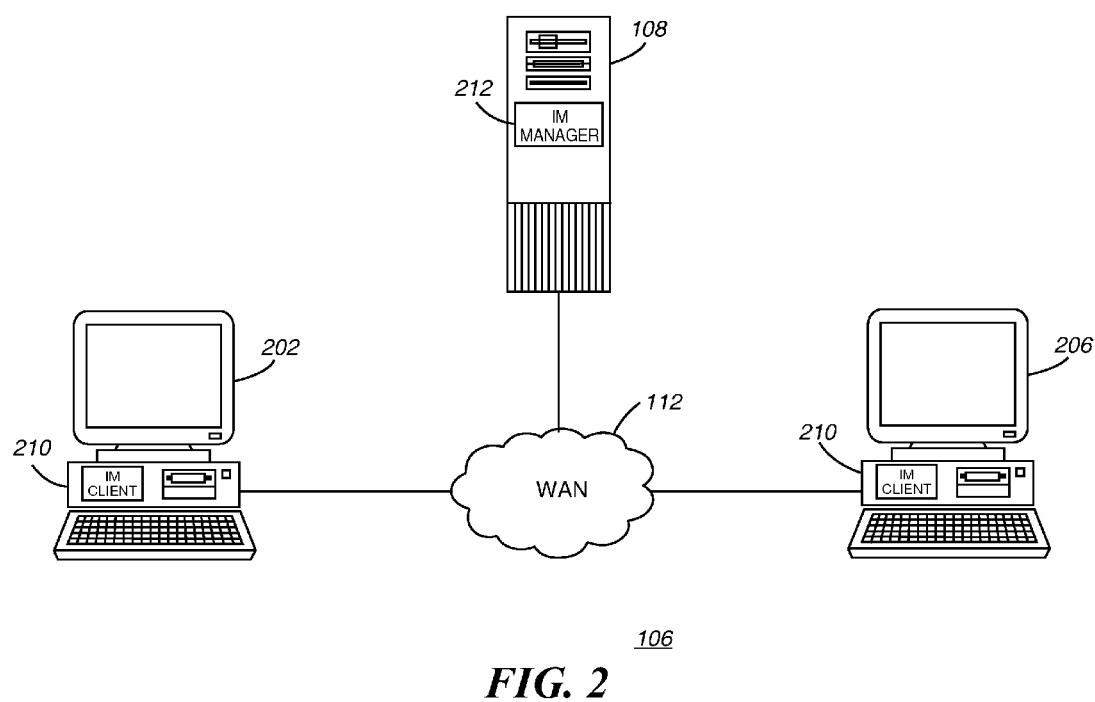
FIG. 2 is a diagram illustrating expert computer systems used to communicate through an instant message server according to an embodiment of the present invention.

FIG. 2 illustrates an exemplary help desk 106 employing an instant messaging system 108 with queuing features in accordance with an embodiment of the present invention. The help desk 106 includes at least one first-level expert computer systems 202 and at least one second-level expert computer system 206 that are communicatively coupled to a messaging server system 108 via a network interface 112. The network interface 112 may be a wide area or local area network interface, and may also be a wired communication link or a wireless communication link. Each expert computer system 202, 206, contains an instant messaging client 210 for sending and receiving instant messages. Each expert computer system 202, 206, has the ability to be a message originator or a message recipient. The expert computer systems 202, 206, may also be communicatively coupled with the world-wide-web (not shown), via a wide area network interface that is a wired, wireless, or combination of wired and wireless network communication links 112. The messaging server 108 contains an instant message manager 212 for controlling the flow of messages between expert systems 202, 206.

Figure 3:
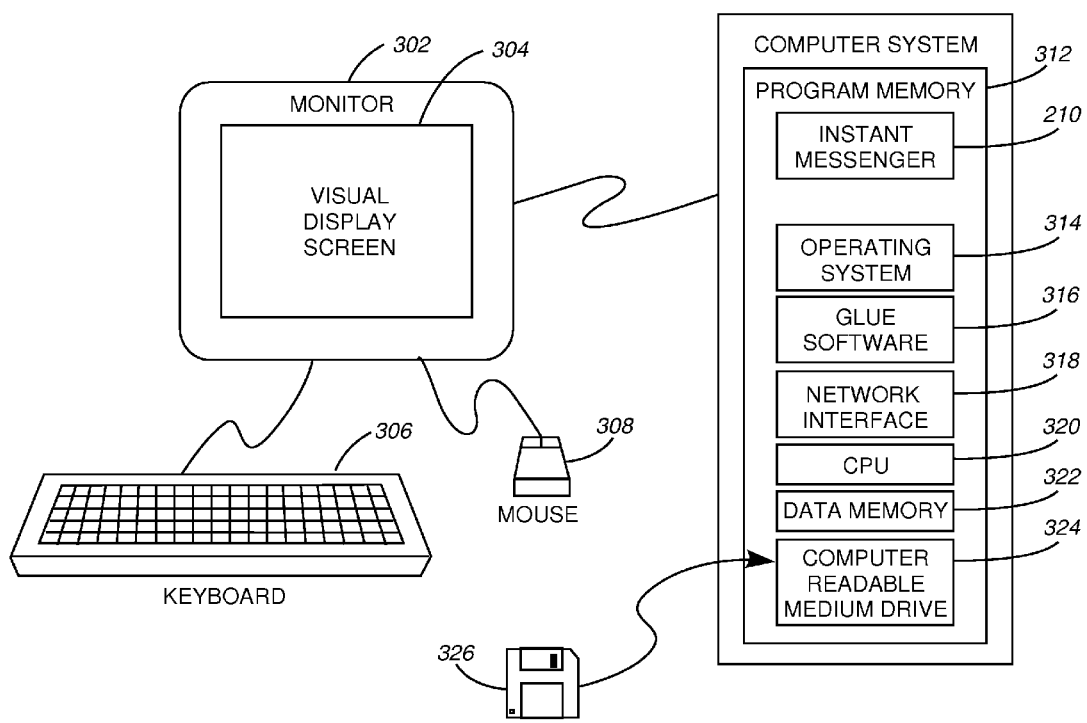
FIG. 3 illustrates an expert computer system according to an embodiment of the present invention.

FIG. 3 illustrates an expert computer system 202, 206, according to the present example, that includes a controller/processor unit 320, which processes instructions, performs calculations, and manages the flow of information through the computer system 202, 206. Additionally, the controller/processor 320 is communicatively coupled with program memory 312. Included within program memory 312 is an instant messaging client 210, operating system platform 314, and glue software 316. Glue software 316 may include drivers, stacks, and low-level application programming interfaces (API's) and provides basic functional components for use by the operating system platform 314 and by compatible applications that run on the operating system platform 314 for managing communications with resources and processes in the computing system 202, 206.

The operating system platform 314, under control of the controller/processor 320, manages resources, such as the data stored in data memory 322, the scheduling of tasks, and processes the operation of the instant messaging client 310 in the program memory 312. The operating system platform 314 also manages a graphical display interface that, according to the present example, comprises the screen 304 on the display monitor 302. Information is displayed via the screen 304 for visual output of information to a user of the computer system 202, 206. A user input interface comprises the keyboard 306 and the mouse 308 for receiving user input from a user of the computer system 202, 206. A communication network interface 318 acts as an input/output and allows for communication with the network link 112. Additionally, the operating system platform 314 also manages many other basic tasks of the computer system 202, 206 in a manner well known to those of ordinary skill in the art.

The controller/processor unit 320 manages a communication network interface 318 for communicating with the network link 112, and a computer-readable medium drive 324. Additionally, the controller/processor unit 320 also manages many other basic tasks of the computer system 202, 206, in a manner well known to those of ordinary skill in the art.

Each expert computer system 202, 206, may include, among other things, a computer readable medium 326 and means for reading and/or writing to the computer readable medium 326. The computer readable medium 326 allows a computer system to read data, instructions, messages or message packets, and other computer readable information from the computer readable medium. The computer readable medium 326, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface 218, including a wired network or a wireless network, that allow a computer to read such computer readable information.

Figure 4:
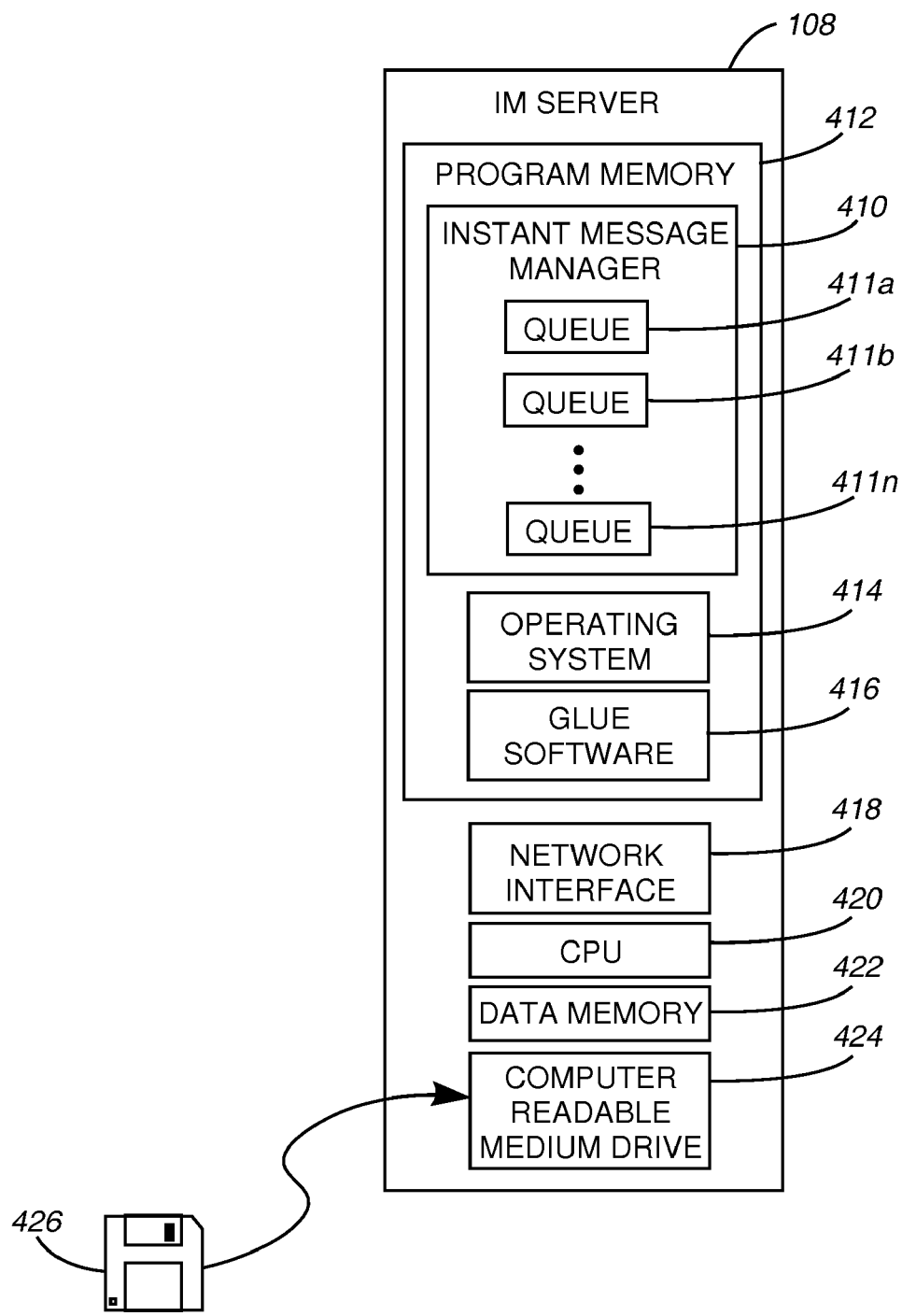
FIG. 4 illustrates an instant message server according to an embodiment of the present invention.

Referring now to FIG. 4, an instant message server 108 is illustrated, according to the present invention, that includes a controller/processor unit 420, which processes instructions, performs calculations, and manages the flow of messages and other information through the instant message server 108. Additionally, the controller/processor 420 is communicatively coupled with program memory 412. Included within program memory 412 is an instant messaging manager 410 that includes a plurality of queues 411a-n (which will be discussed in detail below). The memory 412 also includes an operating system platform 414 and glue software 416. Glue software 416 may include drivers, stacks, and low-level application programming interfaces (API's) and provides basic functional components for use by the operating system platform 414 and by compatible applications that run on the operating system platform 414 for managing communications with resources and processes in the instant message manager 108.

The operating system platform 414, under the control of the controller/processor 420, manages resources, such as the data stored in data memory 422, the scheduling of tasks, and processes the operation of the instant messaging manager 410 in the program memory 412. A communication network interface 418 allows for communicating with the network link 112. Additionally, the operating system platform 414 also manages many other basic tasks of the instant message server 108 in a manner well known to those of ordinary skill in the art.

The controller/processor unit 420 manages resources, such as the data stored in data memory 422, the scheduling of tasks, and the operation of the instant messaging manager 410, including instant messaging queues 411a-n in the program memory 412. The controller/processor unit 420 may also manage a communication network interface 418 for communicating with the network link 112, and a computer-readable medium drive 424. Additionally, the controller/processor unit 420 also manages many other basic tasks of the instant message server 108, in a manner well known to those of ordinary skill in the art.

Each instant message server 108, may include, among other things, one or more additional communicatively coupled computers, user interface devices, such as a keyboard or a display monitor, and at least a computer readable medium 426. The instant message server 108 preferably includes means for reading and/or writing to the computer readable medium 426.

The message server 108 may also include an ephemeral storage system (not shown). This allows the message server 108 to keep its own log of the messages in a discussion. The log can later used as feedback for the entire support process and for training and evaluation purposes.

Figure 5:
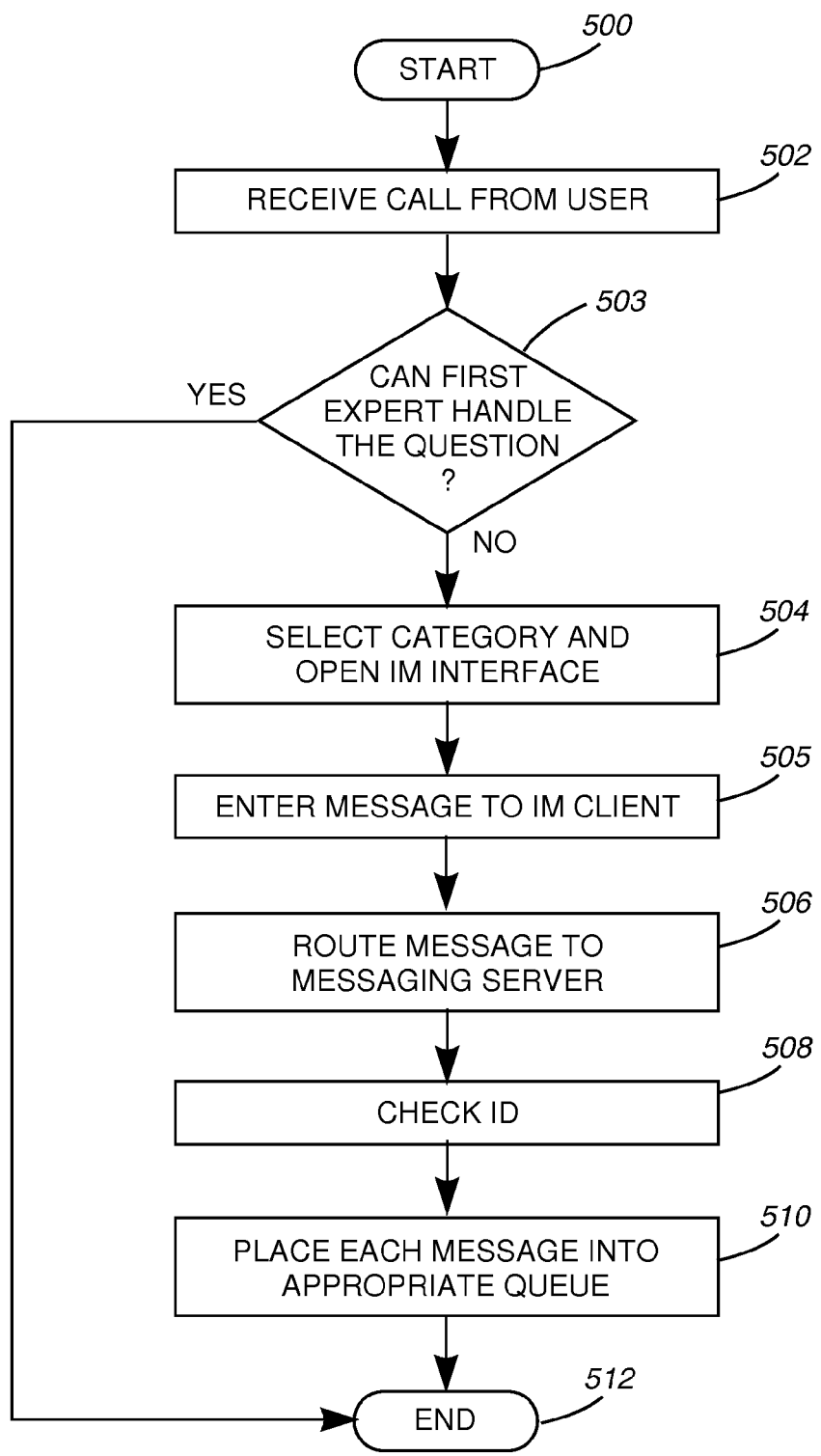
FIG. 5 is an operational flow diagram illustrating an exemplary operational sequence between a first-level expert and the instant message server of FIG. 4 according to an embodiment of the present invention.

FIG. 5 is an operational flow diagram illustrating an exemplary operational sequence between a first-level expert and the instant message server 108 of the system of FIG. 1. The flow begins at step 500 and moves directly to step 502, where a first-level expert receives a call from a user. The first-level expert determines, in step 503, whether or not he is able to answer the user's question. If he is, the user's problem has been solved and the process proceeds directly to step 512 and ends. If, on the other hand, the first-level expert is not able to answer the question, while remaining engaged in the call, the first-level expert, using a first-level expert computer system 202 enters a message or query requesting information or help to the instant messaging client 210.

Figure 10:
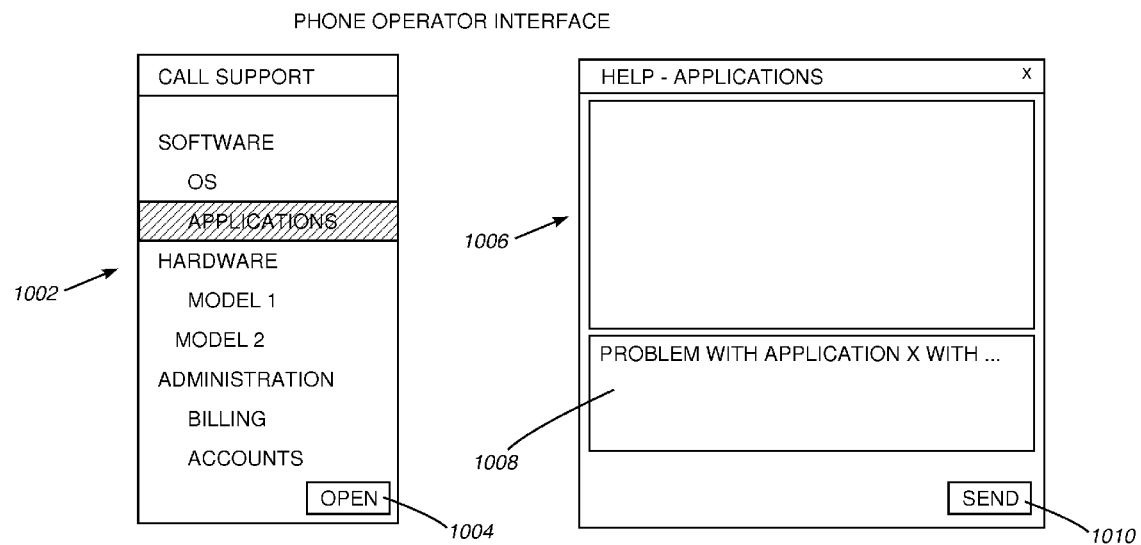
FIG. 10 is a screen shot of a phone operator instant messaging interface according to an embodiment of the present invention.

FIG. 10 shows an instant messenger interface 100, in accordance with an embodiment of the present invention. In a step 504, the first-level expert selects a category of support by highlighting any one of a plurality of categories 1002 for support and clicking on the "open" button 1004. For instance, if the question relates to billing, the first-level expert can select an "accounting" or "billing" category identifier. Upon selection of the open button, an instant message window 1006 appears on the first-level expert's terminal. In step 505, the first-level expert enters a message in the message entry portion 1008 of the instant message window 1006 and hits a send button 1010. The message is then routed through network 112 to the messaging server 108 in step 506.

When the first-level expert selects a category for the message, in step 504, a category identifier is included as part of a unique message identifier (ID). The category identifier helps to ensure that the message is sent to an expert that is knowledgeable in that area. The ID also includes an address of the first-level expert that submitted the message. The address and can be used by the second-level expert to communicate directly back to the submitting first-level expert. In one embodiment, the expert does not have to select a category and instead, the message is identified as a general or given no category identification at all.

Each of the queues 411a-n in the instant messenger client 410 on the instant messenger manager 108, shown in FIG. 4, are storage locations for storing instant messages. In one embodiment of the present invention, each support queue 411a-n corresponds to a category of messages. For instance, support queue 411a corresponds to operating-system-related messages, support queue 411b corresponds to installation messages, support queue 411c corresponds to hardware questions, support queue 411d corresponds to billing questions, etc. The instant message manager 410 may also include queues without categories that are general storage areas for messages with no particular category assigned to them. As the messages arrive at the messaging manager 108, the ID is checked, in step 508, for information pertaining to the category of the message. In step 510, each message is then placed into the appropriate support queue 411a-n based on the category of the message and the process at the first-level expert terminal temporarily ends in step 512.

Figure 6:
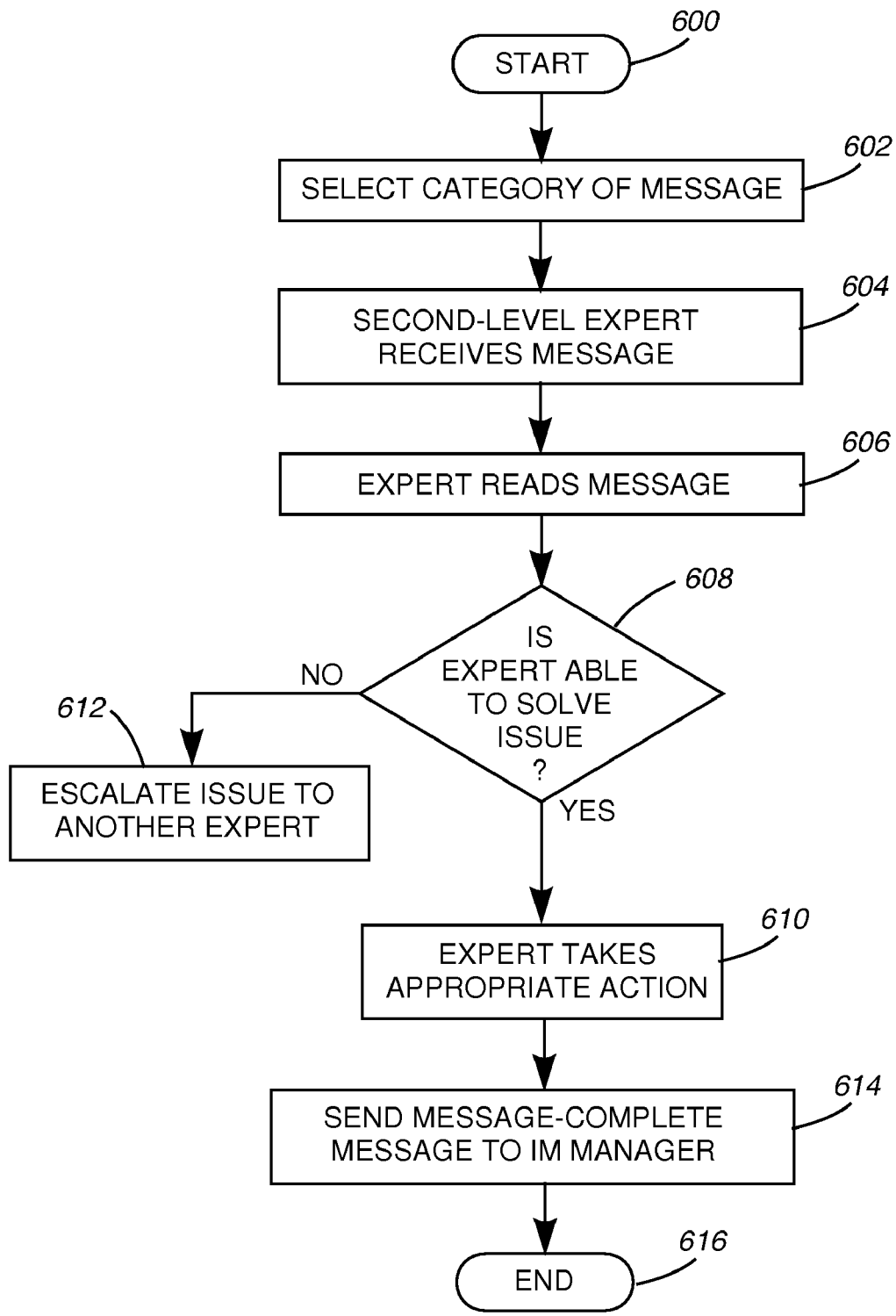
FIG. 6 is an operational flow diagram illustrating an exemplary operational sequence for the system of FIG. 1 at the second-level expert computer system according to an embodiment of the present invention.

FIG. 6 is an operational flow diagram illustrating an exemplary operational sequence for the system of FIG. 1 at the second-level expert computer system 206. The flow begins at step 600 and moves directly to step 602 where a second-level expert connected to the instant message manager 108 selects a category of message to which he wishes to participate in. In other embodiments, the second-level expert may select all or a sub-set of all of the possible categories. After selecting the category or categories, the messages available in the support queue 411 corresponding to that category are made available to the second-level expert. The availability may be made known by showing the expert all the messages stored in the queue, which can include titles, full text of the messages, parts of the messages, or more, that help the expert determine whether the message is a something that that expert will be able to help with, or the messages can be sent directly to the expert's computer system 206 at an appropriate time. The appropriate time, however, can vary with different embodiments of the present invention.

Figure 7:
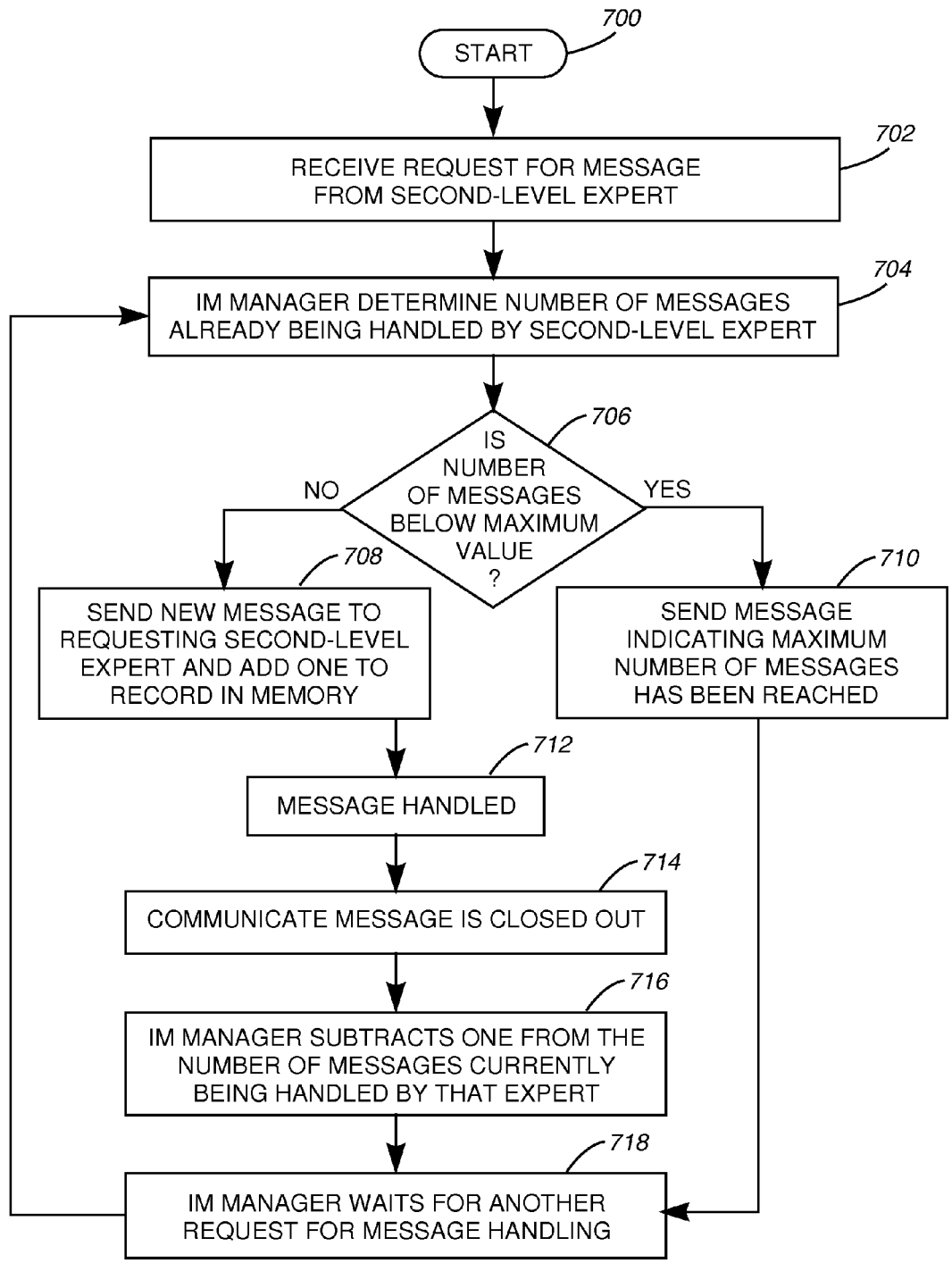
FIG. 7 is an operational flow diagram illustrating a messaging manager monitoring the number of messages being handled at any given time by a second-level expert according to an embodiment of the present invention.

In one embodiment, illustrated in the process flow chart of FIG. 7, the messaging manager 108 monitors the number of messages being handled at any given time by a second-level expert. Second-level experts can handle multiple messages at any given time, however, if the second-level expert attempts to take on too many messages, the expert will not be able to respond quickly to each one, potentially causing user frustration. To prevent this, a maximum number of messages value is assigned to each expert so that no more than that maximum number of messages can be handled by that expert at any given time.

The message monitoring process begins at step 700 and moves directly to step 702, where the instant message manager 108 receives a request from a second-level expert for a new message. The instant message manager 108, in step 704, checks a record stored in memory 422 to determine the number of messages already being handled by the second-level expert. If the number of messages currently being handled is below a maximum number, step 706, a new message is sent to the requesting second-level expert in step 708 and a record of that message is stored in memory 422. If the maximum number of messages has already been reached, a message indicating the same will be sent to the requesting second-level expert in step 710 and the flow continues to a further step 718 where the instant message manager 410 waits for another request for message handling from a second-level expert.

The second-level expert deals with each message by communicating a response using the second-level expert computer system 206 back to the submitting first-level expert computer system 202 in step 712. The second-level expert then communicates in step 714 to the instant messaging manager 108 that the message is dealt with and closed out. In step 716, the instant messaging manager 108 subtracts one from the number of messages currently being handled by that expert. Each time a closed out message is noted, the second-level expert is allowed to receive another message. The instant messaging manager 108 in step 718 then waits for another request from the second-level expert. Once a request is received, the flow returns back to step 704.

Figure 8:
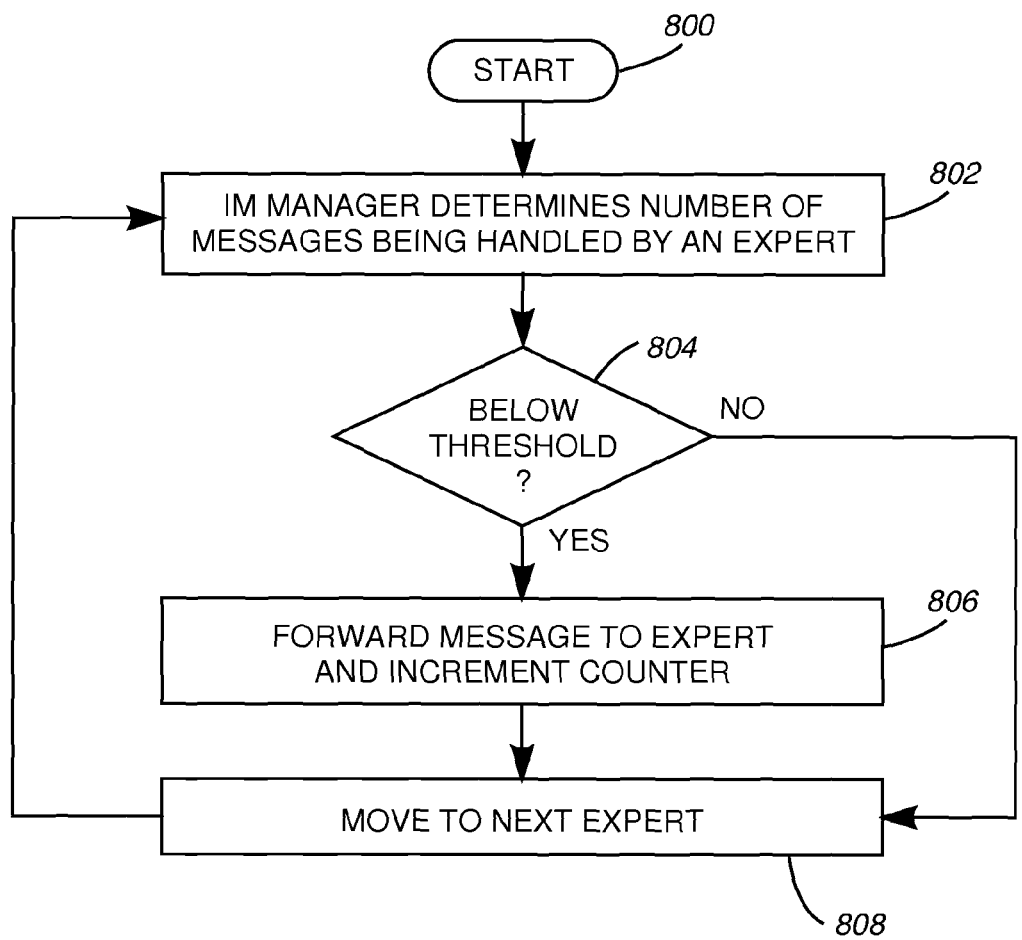
FIG. 8 is an operational flow diagram illustrating an messaging manager sending messages to second-level experts automatically based on their availability according to embodiments of the present invention.

In another embodiment, illustrated in the process flow chart of FIG. 8, the messaging manager 108, which can be a person or an automated process running on a computer system, sends messages to second-level experts automatically based on their availability. In this embodiment, the message manager 108 acts like a load balancer that routes requests to the second-level experts based on any of a number of factors including: current load, duration of each current session for that expert (e.g. if they are long, there might be a problem), max allowed sessions (which could be based on level of expertise of the second-level expert), etc.

The process begins at step 800 and moves directly to step 802 where the instant messaging manager 108 looks at a first second-level expert 411*a* to determine the number of messages being handled by that expert. If the instant messaging manager 108 determines in step 804 that the number of messages being handled by that expert is below a threshold number, the instant messaging manager 108 forwards a message to that second-level expert in step 806 and increments a counter for that expert. The forwarding may be based on categories of the messages and a category selected by the second-level expert 411*a*. The IM manager 108 then moves on to the next expert in step 808.

If, in step 804, it is determined that the number of messages currently being handled by the second-level expert 411*a* exceeds the threshold number, the instant messaging manager 108, in step 808, will move on to the next second-level expert 411*b* without sending a new message to the first second-level expert 411*a*. The flow moves back up to step 804.

Figure 11:
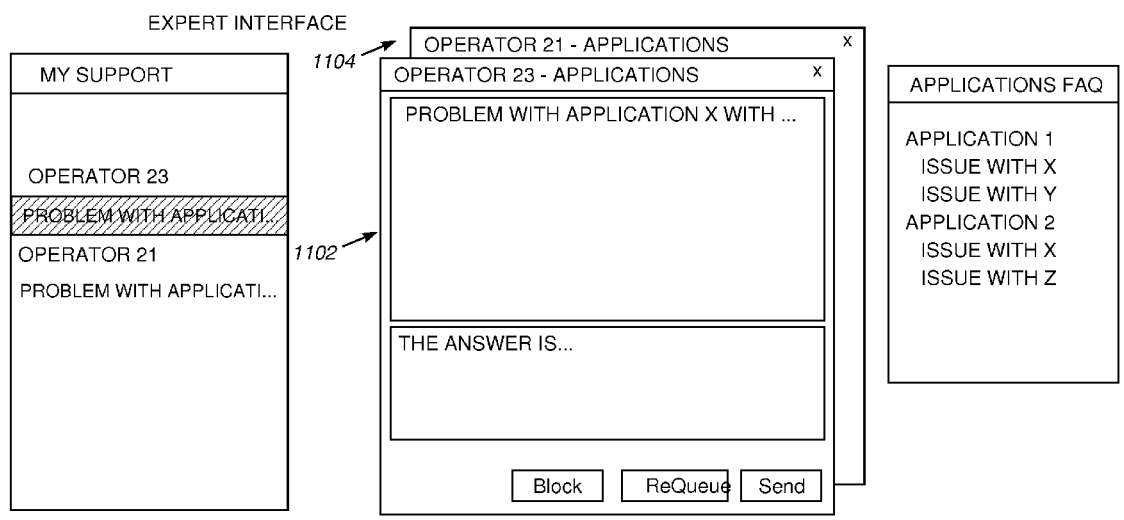
FIG. 11 is a screen shot of an expert instant messaging interface according to an embodiment of the present invention.

Returning back to the flow of FIG. 6, in step 604, the second-level expert receives a message which he can view in the support queue 510 with an interface similar to that shown in FIG. 11 shown on the display 304 of the second-level expert computer system 206. The expert will read the messages 1102 and 1104 in step 606. If the expert determines 608 that he is able to take the appropriate action with regard to the issue presented in the message, he does so in step 610. The appropriate action is usually answering a question or submitting requested information back to the requesting first-level expert. The message may also be an action item that is to be taken by the second-level expert, such as resetting user passwords, crediting user accounts, causing items to be mailed to the user, and many others. The second-level expert is able to communicate directly back to the first-level expert to resolve the issue. Once the task is complete, in step 614, the second-level computer system 206 sends a message-complete message to the instant message manager 108. The process ends at step 610. If, however, the expert determined that he was not able to resolve the issue presented in the message, the expert escalates the issue in step 612 to another expert. After the expert escalates the issue, the process ends for the second-level expert at step 616.

Figure 9:
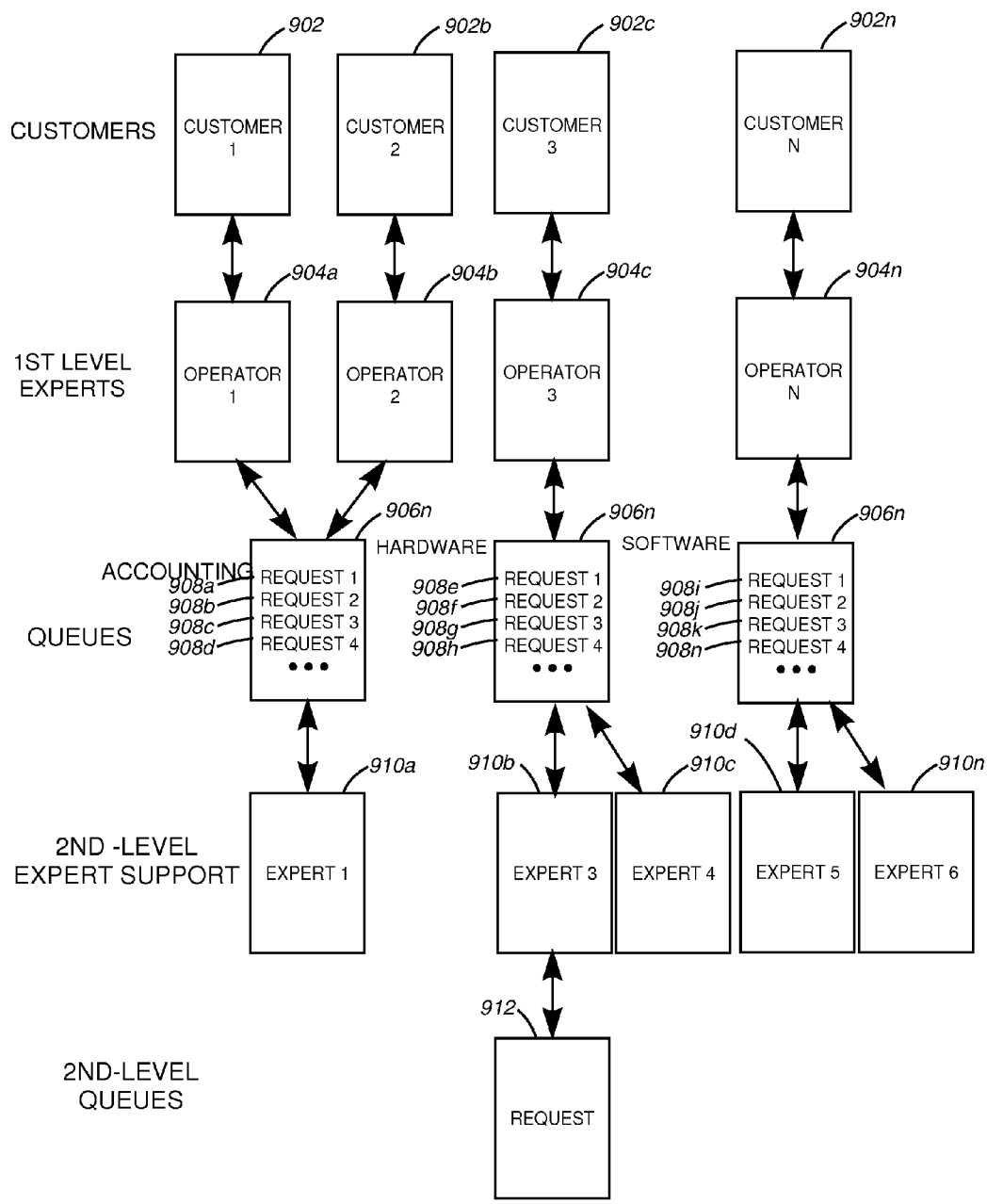
FIG. 9 is a block diagram of a message queuing system according to an embodiment of the present invention.

As should now be clear, the present invention is a business process for support of the help desk operations using instant messaging. FIG. 9 shows a block diagram of a message queuing system 900 according to embodiments of the present invention as described above. The system 900 includes a plurality of customers 902*a-n*, each communicating directly over a phone network with a separate one of a plurality of first-level experts 904*a-n*. The first-level experts 904*a-n* are communicatively coupled to a set of queues 906*a-n*, each corresponding to a separate category, and are able to submit message 908*a-n* to each of the queues. The queues 906*a-n* are accessible to second-level experts 910*a-n*, which may receive the messages to help resolve the issues corresponding to the messages. As is shown in FIG. 9, multiple experts may be assigned to a single support queue, while a single expert may be assigned to another queue. Multiple experts for each category monitor the queues for new requests or be given the requests automatically. There can be an automated system to avoid over flow of one expert with too many requests at one time. In addition, if an expert finds that he cannot handle a taken message, the expert can place the message on a next tier support queue 912 that is available for other experts to pull from in order to solve the issue. One embodiment of the present invention allows the users or customers to directly interact with an instant messenger and use instant messenger categories, via a web site, to circumvent the phone operator and instant message directly the help desk and place messages in categorized queues accessible to experts or to communicate directly with experts.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form. The invention is not limited to instant messaging as any particular application and can include other modes of electronic communication, such as email.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer-implemented method for managing help desk requests, the method comprising:

establishing a communication between an end-user telephony device and a first-level expert client information processing terminal in a help desk, wherein the first-level expert client information processing terminal is associated with a first-level human;

receiving, by the first-level expert client information processing terminal, a request for support from the end-user telephony device;

receiving input from the first-level human expert to place an instant-message query that requests further support from a higher level expert in a support queue that is viewable while in the support queue to a plurality of second-level experts within the help desk, while simultaneously maintaining voice communication between the end user telephony device and the first-level expert client information processing terminal thereby eliminating placing the end-user device on hold, and the input comprising at least a support category associated with the request for support selected by the first-level human user;

generating a unique instant message query identifier based on the support category selected by the user and an communication address associated with the first-level expert client, the unique instant message query identifier being associated with the instant-message query;

placing the instant-message query with the unique instant message query identifier into the support queue corresponding to the support category selected by the user, the support queue being an instant message queue residing on an instant messenger server, the support queue comprising a plurality of instant-message queries;

receiving a selection from at least one second-level expert in the plurality of second-level experts to be associated with the support queue;

selecting, by a support manager application, one of the plurality of second-level experts to receive the instant-message query;

automatically forwarding the instant-message query from the queue to the second-level expert which has been selected;

displaying, in response to receiving the selection from the second-level expert, a portion of each of the plurality of instant-message to the second-level expert;

determining, while the voice communication between the end-user telephony device and the first-level expert client information processing terminal is still established, that a second-level expert in the plurality of second-level experts has satisfied the request, the determining comprising receiving a first instant message comprising an answer to the request for further support; and forwarding, in response to the determining and while voice the communication between the end-user telephony device and the first-level expert client information processing terminal is still established, the first instant message from the second-level expert based on the address associated with the first-level expert that is comprised in the instant message query;

receiving a second instant message from the second-level expert that request has been satisfied and closed out; and updating, in response to receiving the second instant message, a request count associated with the second-level expert to indicate that the second-level expert is able to accept at least one additional request for further support.

2. The computer-implemented method according to claim 1, wherein the selecting is performed by:

monitoring, by the support manager application, a number of queries being handled by each expert in the plurality of second-level experts; and comparing the number of queries being handled by each of the second-level experts to a maximum number of queries to be handled.

3. The computer-implemented method according to claim 1, wherein each sub-queue has a plurality of second-level experts associated therewith in response to each of the plurality of second-level experts selecting the call-support category to be associated therewith.

4. The computer-implemented method according to claim 1, further comprising:

monitoring, by a support manager application, queries being handled by the one of the plurality of second-level experts; and routing requests to one of the plurality of second-level experts based on a combination of:

a number of queries being handled by the one of the plurality of second-level experts;

a duration of at least one current session for the one of the plurality of second-level experts; and a level or expertise of the one of the plurality of second-level experts.

5. The computer-implemented method according to claim 1, further comprising:

placing the instant-message query in an un-categorized sub-queue within the support queue.

6. An instant messaging server for communicating with experts comprising:

a network interface that establishes a communication between an end-user telephony device and a first-level expert client information processing terminal in a help desk, wherein the first-level expert client information processing terminal is associated with a first-level expert human;

the network interface receives, from the first-level expert client information processing terminal, a request for support from the end-user telephony device and receiving input from the first-level human expert to place an instant-message query in a support queue that is viewable while in the support queue to a plurality of second-level experts within the help desk, while simultaneously maintaining voice communication between the end user telephony device and the first-level expert client information processing terminal, thereby eliminating placing the end-user device on hold, and the input comprising at least a support category associated with the request for support selected by the first-level human user; and a processor that performs a method comprising:

generating a unique instant message query identifier based on the support category selected by the user and an communication address associated with the first-level expert client, the unique instant message query identifier being associated with the instant-message query;

placing the instant-message query with the unique instant message query identifier into the support queue corresponding to the support category selected by the user, the support queue being an instant message queue residing on an instant messenger server, the support queue comprising a plurality of instant-message queries;

receiving a selection from at least one second-level expert in the plurality of second-level experts to be associated with the support queue;

selecting, by a support manager application, one of the plurality of second-level experts to receive the instant-message query;

automatically forwarding the instant-message query from the queue to the second-level expert which has been selected;

displaying, in response to receiving the selection from the second-level expert, a portion of each of the plurality of instant-message to the second-level expert;

determining, while the voice communication between the end-user telephony device and the first-level expert client information processing terminal is still established, that a second-level expert in the plurality of second-level experts has satisfied the request, the determining comprising receiving a first instant message comprising an answer to the request for further support; and forwarding, in response to the determining and while the voice communication between the end-user a telephony device and the first-level expert client information processing terminal is still established, the first instant message from the second-level expert based on the address associated with the first-level expert that is comprised in the instant message query;

receiving a second instant message from the second-level expert that request has been satisfied and closed out; and updating, in response to receiving the second instant message, a request count associated with the second-level expert to indicate that the second-level expert is able to accept at least one additional request for further support.

7. The instant messaging server according to claim 6, wherein the processor monitors a number of queries being handled by experts in the plurality of second-level experts and prevents the automatically forwarding of the query to a second expert in the plurality of second-level experts based on a combination of:
- a number of queries being handled by the one of the plurality of second-level experts;
- a duration of at least one current session for the one of the plurality of second-level experts; and
- a level or expertise of the one of the plurality of second-level experts.

8. The instant messaging server according to claim 6, wherein the processor is further for placing the instant-message query in an un-categorized sub-queue within an instant messaging support queue.

9. The instant messaging server according to claim 6, wherein the input receives from one of the plurality of second-level experts, a request for delivery of the query, and wherein the processor monitors a number of queries being handled by the one of the plurality of second-level experts and denies the request for delivery of the query to the one of the plurality of second-level experts if the number of queries being handled by the one of the plurality of second-level experts exceeds a maximum number of queries to be handled.

10. The instant messaging server according to claim 6, further comprising:
- a memory for storing a log of the query and a second-level expert's response to the query.

11. A non-transitory computer program product for managing help desk requests, the tangible computer program product comprising:
- a storage medium readable by a processing circuit and storing instructions for execution by the processing circuit for performing a method comprising:
  - establishing a communication between an end-user telephony device and a first-level expert client information processing terminal in a help desk, wherein the first-level expert client information processing terminal is associated with a first-level human;
  - receiving, by the first-level expert client information processing terminal, a request for support from the end-user telephony device;
  - receiving input from the first-level human expert to place an instant-message query that requests further support from a higher level expert in a support queue that is viewable while in the support queue to a plurality of second-level experts within the help desk, while simultaneously maintaining voice communication between the end user telephony device and the first-level expert client information processing terminal, thereby eliminating placing the end-user device on hold, and the input comprising at least a support category associated with the request for support selected by the first-level human user;
  - generating a unique instant message query identifier based on the support category selected by the user and an communication address associated with the first-level expert client, the unique instant message query identifier being associated with the instant-message query;
  - placing the instant-message query with the unique instant message query identifier into the support queue corresponding to the support category selected by the user, the support queue being an instant message queue residing on an instant messenger server, the support queue comprising a plurality of instant-message queries;
  - receiving a selection from at least one second-level expert in the plurality of second-level experts to be associated with the support queue;
  - selecting, by a support manager application, one of the plurality of second-level experts to receive the instant-message query;
  - automatically forwarding the instant-message query from the queue to the second-level expert which has been selected;
  - displaying, in response to receiving the selection from the second-level expert, a portion of each of the plurality of instant-message to the second-level expert;
  - determining, while the voice communication between the end-user telephony device and the first-level expert client information processing terminal is still established, that a second-level expert in the plurality of second-level experts has satisfied the request, the determining comprising receiving a first instant message comprising an answer to the request for further support; and
  - forwarding, in response to the determining and while voice the communication between the end-user telephony device and the first-level expert client information processing terminal is still established, the first instant message from the second-level expert based on the address associated with the first-level expert that is comprised in the instant message query;
  - receiving a second instant message from the second-level expert that wherein the instant message from the second-level expert indicates to the first-level expert that the request has been satisfied and closed out; and
  - updating, in response to receiving the second instant message, a request count associated with the second-level expert to indicate that the second-level expert is able to accept at least one additional request for further support.

* * * * *